(12) United States Patent
Dhandhania

(10) Patent No.: US 12,442,831 B2
(45) Date of Patent: Oct. 14, 2025

(54) PITOT TUBE SENSING APPARATUS

(71) Applicant: AIRBUS SAS, Blagnac (FR)

(72) Inventor: Anmol Dhandhania, Bristol (GB)

(73) Assignee: AIRBUS (SAS), Blagnac (FR)

( * ) Notice: Subject to any disclaimer, the term of this patent is extended or adjusted under 35 U.S.C. 154(b) by 308 days.

(21) Appl. No.: 18/338,067

(22) Filed: Jun. 20, 2023

(65) Prior Publication Data

US 2023/0408720 A1  Dec. 21, 2023

(30) Foreign Application Priority Data

Jun. 21, 2022 (IN) .............................. 202211035631

(51) Int. Cl.
| | | |
|---|---|---|
| *G01P 5/165* | (2006.01) | |
| *B64D 15/20* | (2006.01) | |
| *G01F 1/46* | (2006.01) | |

(52) U.S. Cl.
CPC .............. *G01P 5/165* (2013.01); *B64D 15/20* (2013.01); *G01F 1/46* (2013.01)

(58) Field of Classification Search
CPC ... G01P 5/16; G01P 5/165; G01F 1/46; B64D 15/20
See application file for complete search history.

(56) References Cited

U.S. PATENT DOCUMENTS

| | | | |
|---|---|---|---|
| 5,191,791 A | 3/1993 | Gerardi | |
| 5,438,880 A | 8/1995 | Washburn | |
| 6,205,376 B1 * | 3/2001 | Gordon | ..................... G01P 5/16 |
| | | | 701/4 |
| 8,060,334 B1 | 11/2011 | Jarvinen | |
| 9,322,685 B2 | 4/2016 | Ray | |
| 10,018,489 B2 | 7/2018 | Moukharski et al. | |
| 10,126,320 B2 * | 11/2018 | Anderson | ............... G01P 5/165 |
| 10,155,373 B2 | 12/2018 | Nino et al. | |
| 11,203,438 B1 | 12/2021 | Sishtla | |
| 11,662,362 B2 * | 5/2023 | Oltheten | ............... G01P 21/025 |
| | | | 73/1.29 |
| 2020/0361597 A1 | 11/2020 | Llamas Sandin | |
| 2021/0096149 A1 | 4/2021 | Inman et al. | |

FOREIGN PATENT DOCUMENTS

| | | |
|---|---|---|
| EP | 0781705 A2 | 7/1997 |
| EP | 3783369 | 2/2021 |
| EP | 3822642 | 5/2021 |
| WO | 19932963 | 7/1999 |
| WO | 2009/000244 A1 | 12/2008 |

OTHER PUBLICATIONS

EP Search Report for Application No. 23179220.1-1001, dated Nov. 13, 2023, nine pages.
Combined Search and Examination Report for GB2211569.5 dated Jan. 30, 2023, 5 pages.

* cited by examiner

*Primary Examiner* — Justin N Olamit
(74) *Attorney, Agent, or Firm* — Nixon & Vanderhye P.C.

(57) ABSTRACT

A pitot tube sensing apparatus and method are disclosed for determining the presence or absence of a foreign object within the pitot tube sensing apparatus, and including a pitot tube having a channel, a pressure sensor coupled to the channel, a capacitor and a system. The capacitor includes two electrodes on opposing sides of the channel. The system measures a parameter indicative of a capacitance between the two electrodes and determines the presence or absence of a foreign object within the channel based on the parameter.

20 Claims, 5 Drawing Sheets

PITOT TUBE SENSING APPARATUS

CROSS REFERENCE TO RELATED APPLICATION

The present application claims priority benefits from Indian Patent Application IN 202211035631, filed Jun. 21, 2022, the entire contents of which is hereby incorporated by reference.

FIELD OF THE INVENTION

The present invention relates to a pitot tube sensing apparatus and a method of determining the presence or absence of a foreign object within the pitot tube sensing apparatus. In particular, the pitot tube sensing apparatus is suitable for use with an aircraft.

BACKGROUND OF THE INVENTION

A pitot tube sensing apparatus typically comprises a pitot tube coupled to a pressure sensor. A pitot tube sensing apparatus may be used to measure pressure to determine fluid flow speed.

Pitot tube sensing apparatus is widely used to determine the airspeed of an aircraft; the water speed of a boat; or the flow velocity of liquids, air, and gases in industry. A generic prior art pitot tube sensing apparatus comprises a pitot tube directly coupled to a pressure sensor. The pitot tube is arranged with an opening which points directly into a fluid flow, the fluid then stagnates in the pitot tube as there is no outlet to allow the flow to continue. The pressure sensor then measures the total pressure in the pitot tube.

The total pressure can be described as the static pressure plus the dynamic pressure. The speed of the fluid can be calculated from the dynamic pressure. For many applications the static pressure is a pre-defined and known pressure. However, the static pressure can vary for aircraft when changing altitude. In such applications where the static pressure is not pre-defined or known, a static pressure sensor can be added to the pitot tube sensing apparatus to measure the static pressure.

A pitot tube comprises a channel which can be blocked by foreign objects such as ice, dust, dirt, sand, insects, protective covers, and other debris. This can lead to an erroneous pressure measurement at the pressure sensor.

A pitot tube sensing apparatus is typically used with aircraft as a primary source of total pressure to determine airspeed. Before take-off, the pitot tube should ideally be clear of foreign objects.

There is therefore a desire to ensure that a pitot tube is clear of foreign objects.

SUMMARY OF THE INVENTION

A first aspect of the invention provides a pitot tube sensing apparatus comprising: a pitot tube comprising a channel; a pressure sensor coupled to the channel; a capacitor comprising two electrodes on opposing sides of the channel, wherein the two electrodes conform to the shape of an inner surface of the channel; and a system configured to: measure a parameter indicative of a capacitance between the two electrodes; and determine the presence or absence of a foreign object within the channel based on the parameter.

The pitot tube sensing apparatus may comprise electrical shielding between the capacitor and the pitot tube.

The parameter may comprise a voltage between the two electrodes.

Optionally the system is configured to measure the parameter by applying current across the capacitor.

The determination of the presence or absence of a foreign object may be based on a comparison of the parameter to a detection threshold.

The system may be further configured to calculate a rate of change in the parameter. The determination of the presence or absence of a foreign object may be based on a comparison of the rate of change in the parameter to a detection threshold. Advantageously, this determination may result in a more reliable determination of a foreign object.

The inner surface of the channel may have a curved shape in a plane perpendicular to a length of the channel. Each electrode may also have an inner or outer surface with a curved shape in the plane. Advantageously, electrodes conforming to the inner surface preserves the cross-sectional shape of the flow passage, and may also improve pressure reading accuracy.

The channel may be in the shape of a cylinder. Each electrode may be in the shape of a cylindrical arc.

The pitot tube sensing apparatus may further comprise a trap. The capacitor may be between an opening of the channel and the trap. The trap may be arranged to block foreign objects from reaching the pressure sensor.

The pitot tube sensing apparatus may be further configured to generate an alert upon determining the presence of a foreign object within the channel.

The pitot tube sensing apparatus may be configured to determine a fluid speed based on an output of the pressure sensor.

The electrodes may be positioned in the channel between an opening of the channel and the pressure sensor.

The pressure sensor may be configured to measure a total pressure in the channel. The pitot tube sensing apparatus may further comprise a static pressure sensor configured to measure a static pressure. The pitot tube sensing apparatus may be further configured to calculate a fluid speed based on a difference between the total pressure and the static pressure.

A further aspect of the invention provides an aircraft comprising the pitot tube sensing apparatus of the first aspect.

The pitot tube sensing apparatus may be configured to determine an air speed of the aircraft based on an output of the pressure sensor. A further aspect of the invention provides a pitot tube sensing apparatus comprising: a pitot tube comprising a channel; a pressure sensor coupled to the channel; a capacitor comprising two electrodes on opposing sides of the channel; and a system configured to: measure a parameter indicative of a capacitance between the two electrodes; determine the presence or absence of a foreign object within the channel based on the parameter; and calculate a rate of change in the parameter, wherein the determination of the presence or absence of a foreign object is based on a comparison of the rate of change in the parameter to a detection threshold. The third aspect of the invention may be combined with optional features of the first and/or second aspect of the invention. Optionally, the two electrodes conform to the shape of an inner surface of the channel.

A further aspect of the invention provides a method of determining the presence or absence of a foreign object within a pitot tube sensing apparatus, wherein the pitot tube sensing apparatus comprises: a pitot tube comprising a channel with an opening; a pressure sensor coupled to the channel; and a capacitor comprising two electrodes on opposing sides of the channel, the method comprising: measuring a parameter indicative of a capacitance between the two electrodes; and determining the presence or absence of a foreign object within the channel based on the parameter.

The parameter may comprise a voltage between the two electrodes.

Determining the presence or absence of a foreign object may be based on a comparison of the parameter to a detection threshold.

The method may further comprise calculating a rate of change in the parameter. The determination of the presence or absence of a foreign object may be based on a comparison of the rate of change in the parameter to a detection threshold.

The method may further comprise generating an alert upon determining the presence of a foreign object within the channel.

BRIEF DESCRIPTION OF THE DRAWINGS

Embodiments of the invention will now be described with reference to the accompanying drawings, in which:

FIG. 1b shows a port-side view of the front portion of the aircraft of FIG. 1a;

DETAILED DESCRIPTION OF EMBODIMENT(S)

Figure 1A:
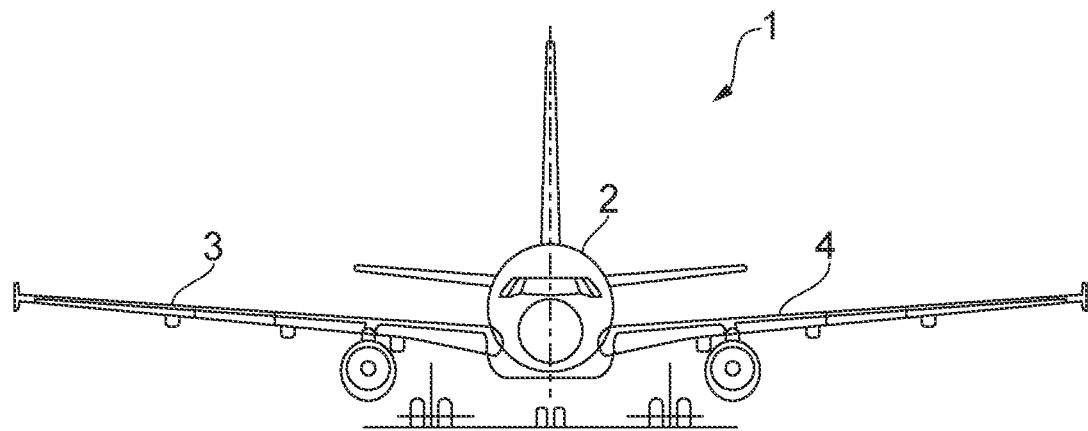
FIG. 1a shows a front view of an aircraft.
Figure 1B:
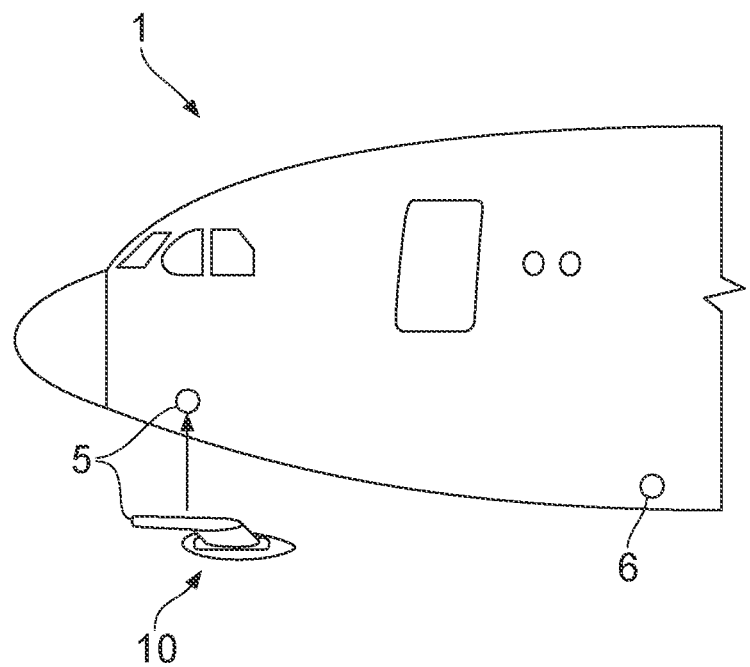

Like reference numerals refer to like parts throughout the specification. With reference to FIGS. 1a and 1b, a passenger aircraft 1 is shown. The aircraft 1 comprises a fuselage 2 for holding passengers and/or cargo, a starboard wing 3 and a port wing 4.

FIG. 1b shows a port-side view of the front portion of the passenger aircraft 1. A pitot tube opening 5 of a pitot tube sensing apparatus 10 is positioned such that when the aircraft 1 is in flight a pressure sensor of the pitot tube sensing apparatus 10 is arranged to measure the total pressure. For example, the axis of the pitot tube can be approximately in the same direction as the direction of travel of the aircraft 1.

A static pressure sensor opening 6 of a static pressure sensor is positioned such that when the aircraft 1 is in flight the static pressure sensor is arranged to measure the static pressure. For example, the axis of the static pressure sensor can be approximately perpendicular to the axis of the pitot tube.

Figure 2:
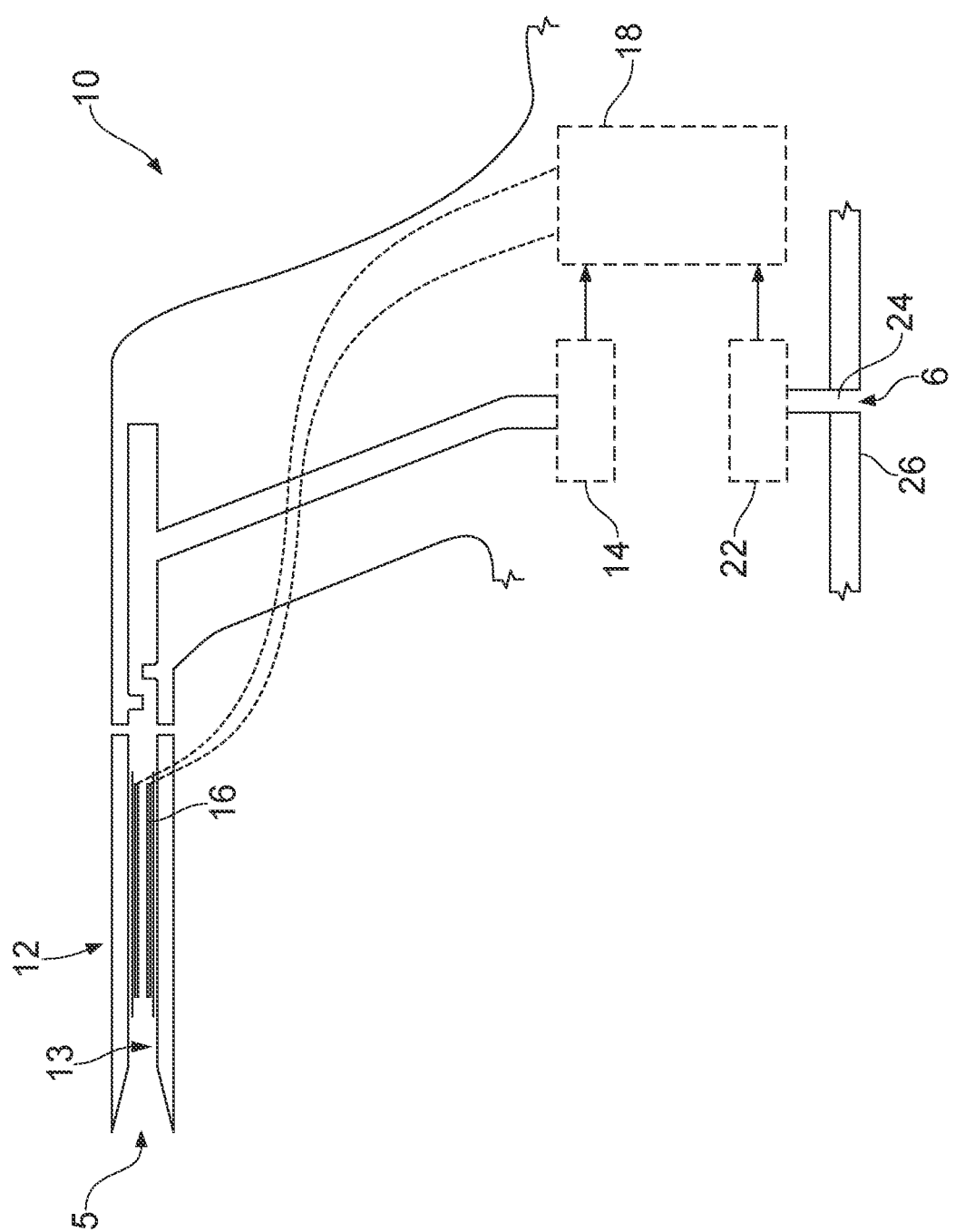
FIG. 2 shows a cross section port-side view of a pitot tube sensing apparatus.

FIG. 2 shows a cross sectional side view of the pitot tube sensing apparatus 10. The pitot tube sensing apparatus 10 comprises: a pitot tube 12 comprising a channel 13; a total pressure sensor 14 coupled to the channel 13; a capacitor 16; and a system 18.

The channel 13 has a channel opening 5 which, when in use, points into an air flow. The air in the pitot tube 12 then stagnates as there is no substantial outlet to allow the air flow to continue. The total pressure sensor 14 then measures the total pressure in the pitot tube 12.

The total pressure is the static pressure plus the dynamic pressure. The aircraft 1 comprises a static pressure sensor 22 to measure the static pressure of the air outside of the aircraft 1. The static pressure sensor 22 is connected to the outside of the aircraft 1 by a static channel 24 comprising an opening 6 through the skin 26 of the aircraft 1.

The system 18 is in communication with the total pressure sensor 14 and the static pressure sensor 22. The system 18 is configured to receive the total pressure measurement from the total pressure sensor 14, and the static pressure measurement from the static pressure sensor 22. The system 18 is configured to calculate the airspeed based on a difference between the total pressure measurement and the static pressure measurement.

The capacitor 16 is arranged such that if a foreign object is present in the channel 13 then the capacitance of the capacitor 16 will change.

The system 18 is electrically connected to the capacitor 16. The system 18 is configured to determine the presence or absence of a foreign object within the channel 13 based on measuring a parameter indicative of a capacitance of the capacitor 16.

Figure 3:
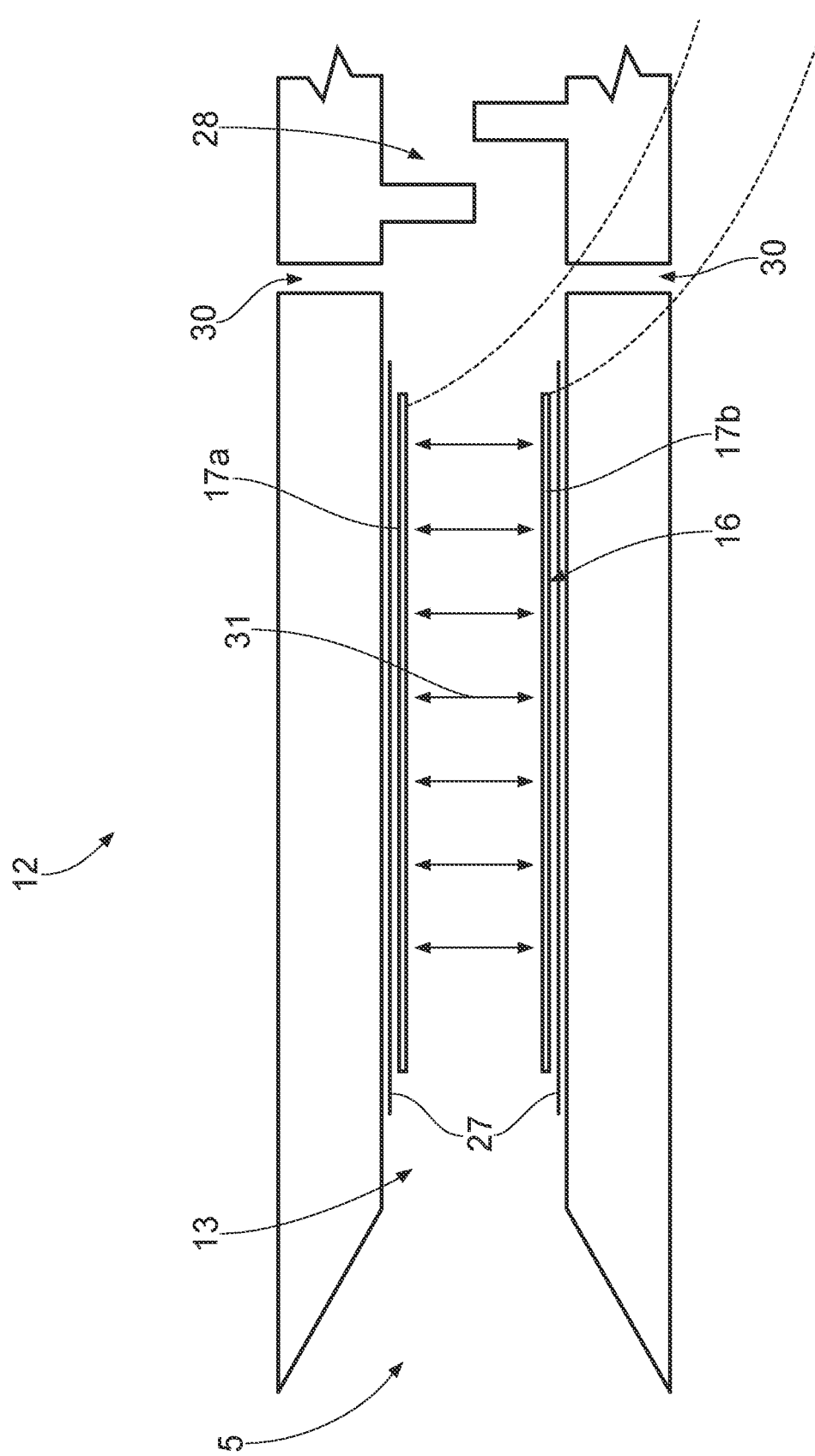
FIG. 3 shows a cross section port-side view of a pitot tube of the pitot tube sensing apparatus of FIG. 2.

FIG. 3 shows a magnified view of FIG. 2. Specifically, FIG. 3 shows a cross-section port-side view of the pitot tube 12 of the pitot tube sensing apparatus 10.

The capacitor 16 comprises two electrodes 17a, 17b, on opposing sides of the channel 13. Electric field lines 31 are shown between the two electrodes 17a, 17b of the capacitor 16. The capacitance of the capacitor 16 is:

$$C = \frac{\varepsilon A}{d} \quad (1)$$

Where:

A is the effective overlap area of the two electrodes 17a, 17b;

d is the effective distance between the two electrodes 17a, 17b; and

ε is the permittivity of the medium between the two electrodes 17a, 17b.

When the channel is clear of foreign objects then E is relatively stable, since the permittivity of air is relatively stable. However, when a foreign object enters the channel 13 then ε changes, such that a change in capacitance of the capacitor 16 can be detected either directly or indirectly by the system 18. Therefore, the capacitor 16 is configured as a sensor to detect the presence or absence of a foreign object within the channel 13.

The capacitor 16 may be adhered to the inner surface of the channel 13. Alternatively, the capacitor 16 can be integrated into the pitot tube 12. The capacitor 16 of the pitot tube sensing apparatus 10 may be positioned around, positioned at, or integrated into the pitot tube 12 in any way in which it can detect the presence or absence of a foreign object within the channel 13.

The pitot tube sensing apparatus 10 comprises electrical shielding 27 between the capacitor 16 and the pitot tube 12. The electrical shielding 27 is arranged to insulate the two electrodes 17a, 17b from the pitot tube 12 and/or from each other. The electrical shielding 27 may result in a more accurate measurement from the capacitor 16. The electrical shielding 27 may be necessary if the pitot tube 12 is made from a conductive material which could short the two electrodes 17a, 17b together. However, if the pitot tube 12 is made of an insulating material (e.g., plastic), then electrical shielding 27 may not be necessary.

Optionally the pitot tube sensing apparatus 10 comprises a trap 28 which is arranged to block foreign objects from reaching the pressure sensor 14. The capacitor 16 can be located between the opening 5 and the trap 28.

Optionally the pitot tube sensing apparatus 10 comprises one or more drain holes 30. The drain holes 30 are arranged to allow liquids to drain out of the channel 13. This can prevent liquid build-up in the channel 13 from damaging (and/or blocking the channel 13) the pitot tube sensing apparatus 10, for example, when water freezes. The capacitor 16 is between the opening 5 and the one or more drain holes 30.

Figure 4:
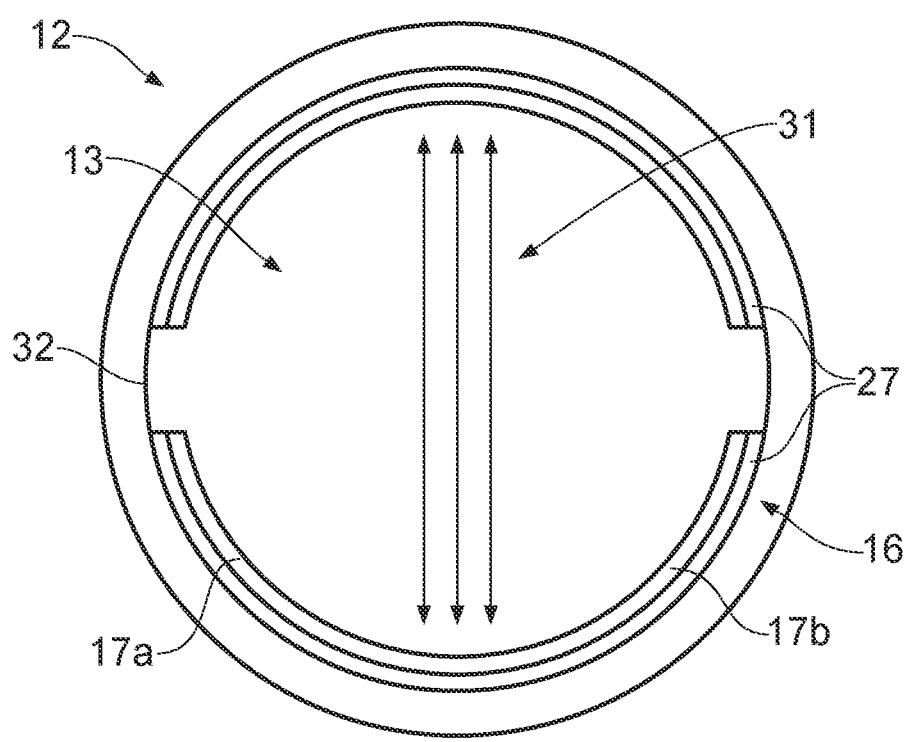
FIG. 4 shows a cross section front view of a pitot tube of the pitot tube sensing apparatus of FIG. 2.

FIG. 4 shows a cross section front view of the pitot tube 12, the capacitor 16, and the electrical shielding 27. Electric field lines 31 are shown between the two electrodes 17a, 17b of the capacitor 16.

The two electrodes 17a, 17b, conform to the shape of the inner surface 32 of the channel 13. A benefit of the two electrodes 17a, 17b, conforming to the shape of the inner surface 32 of the channel 13 is that it maximises the detection volume of the capacitor 16 which can be used to detect foreign objects. In addition, the capacitor 16 is beneficially not obstructing the pitot tube 12.

As shown in FIG. 4, the cross section of the pitot tube 12 is circular because the pitot tube 12 and its channel 13 are cylindrical. Each electrode 17a, 17b is therefore in the shape of a cylindrical arc (with an arc cross-section as shown in FIG. 4). Each electrode 17a, 17b can be described as conforming to the shape of the channel 13 because the channel 13 is in the chape of a cylinder and each electrode 17a, 17b is in the shape of a cylindrical arc. Put another way, the two electrodes 17a, 17b conform to the shape of an inner surface 32 of the channel in the sense that the inner surface 32 of the channel and the inner and outer surfaces of each electrode 17a, 17b have a curved shape in a plane perpendicular to a length of the channel 13.

Turning to the functionality of the pitot tube sensing apparatus 10, system 18 is configured to measure the parameter indicative of a capacitance of the capacitor 16. The parameter may comprise a voltage between the two electrodes 17a, 17b.

The system 18 can be configured to apply a current across the capacitor 16 and measure the voltage change caused by a blocking event. The blocking event is the event of a foreign object entering the channel 13 and getting lodged in the pitot tube 12. The blocking event causes a change in the permittivity of the medium between the two electrodes 17a, 17b, which results in a change in capacitance of the capacitor 16. The system 18 can be configured to apply a Direct Current (DC) or an Alternating Current (AC) to the capacitor 16 to detect a blocking event. In the case of DC the capacitor 16 will need to be polarized and in the case of AC the capacitor 16 will not need to be polarized.

The change in capacitance causes a change in an impedance of the capacitor 16. For a constant current if the impedance changes then the measured voltage also changes.

Figure 5A:
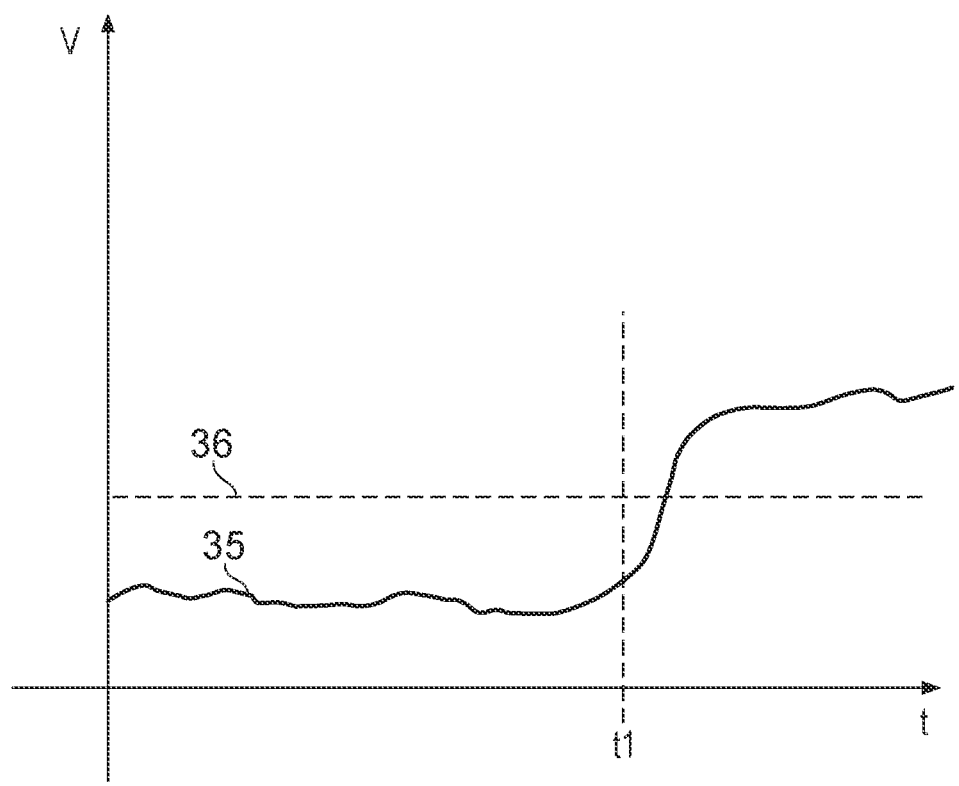
FIG. 5a shows a graph of voltage against time.
Figure 5B:
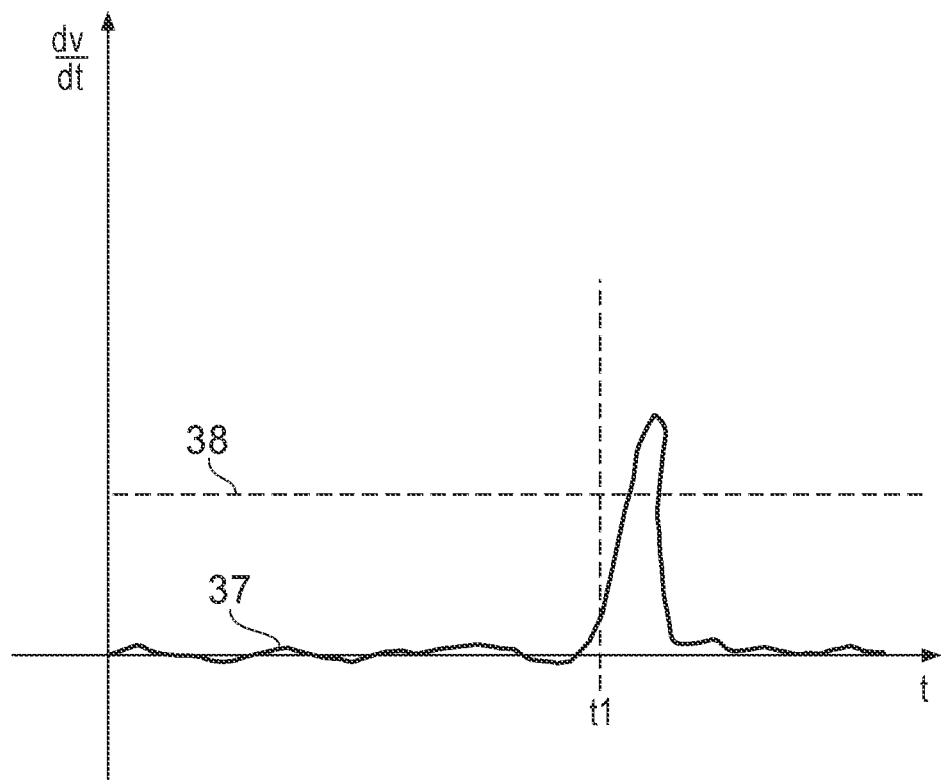
FIG. 5b shows a graph of rate of change in voltage against time.

FIGS. 5a and 5b show graphs of voltage against time, and rate of change of voltage against time respectively, for the blocking event. The blocking event occurs at time t1.

FIG. 5a shows the voltage received by the system 18. At time t1, a blocking event occurs, and the voltage received by the system 18 raises as a result. The system 18 can determine the presence or absence of a foreign object based on a comparison of the measured parameter 35 and a detection threshold 36. The system 18 can determine the presence of a foreign object if the voltage raises above the detection threshold 36. The system 18 can determine the absence of a foreign object if the voltage does not rise above the detection threshold 36. As shown in FIG. 5a, the detection threshold 36 is breached shortly after t1, thus the system 18 can determine the presence of a foreign object shortly after t1.

FIG. 5b shows the rate of change of the voltage received by the system 18. At time t1, a blocking event occurs, and the rate of change of the voltage received by the system 18 raises as a result. The system 18 can determine the presence or absence of a foreign objected based on a comparison of the rate of change in the parameter 37 to a detection threshold 38. The system 18 can determine the presence of a foreign object if the rate of change of voltage raises above the detection threshold 38. The system 18 can determine the absence of a foreign object if the rate of change of voltage does not raise above the detection threshold 38. In FIG. 5b, the detection threshold 38 is breached shortly after t1, thus the system 18 can determine the presence of a foreign object shortly after t1.

The system 18 can be configured to determine the presence or absence of a foreign object based on the voltage received and/or the rate of change of the voltage received.

The system 18 can generate an alert upon determining the presence of a foreign object within the channel 13. For example, in the aircraft 1, the alert may be a warning light in the cockpit and/or an audible alarm.

The system 18 can be one or more processing systems, controllers, computers, etc. or any combination.

In an alternative example, the pitot tube may be a pitot-static tube wherein the static pressure sensor opening may be integrated into the pitot tube. A pitot-static tube comprises a second channel co-axial with the channel of the pitot tube, wherein the second channel comprises one or more static pressure sensor openings along the sides of the pitot-static tube.

The static pressure may be considered to be a constant for certain applications, for example in motor vehicles, boats, or other applications with an approximately constant altitude. Therefore, in an alternative example, no static pressure sensor (e.g. static pressure sensor 22) or static pressure sensor opening (e.g. static pressure sensor opening 6) may be present in the pitot tube sensing apparatus.

The pressure sensor of the pitot tube sensing apparatus may be arranged to measure the dynamic pressure (i.e. the difference between the total pressure and the static pressure). For example, such pressure sensors may comprise a diaphragm between a total pressure chamber and a static pressure chamber, wherein the diaphragm position/deformation may be indicative of the dynamic pressure. In another example, the pressure sensor may be a manometer to provide a dynamic pressure measurement. Therefore, the system of the pitot tube sensing apparatus can be configured to determine a fluid speed based on an output of the pressure sensor, if the pressure sensor measures dynamic pressure and/or the static pressure is (or can be assumed to be) a known constant.

Although the pitot tube sensing apparatus has been described for use with air, it can also be used to measure the pressure in any fluid. For example, the fluid may be water when the pitot tube sensing apparatus 10 of FIG. 2 is used on a boat.

The two electrodes of the capacitor of the pitot tube sensing apparatus may be positioned in the channel between the opening of the channel and the pressure sensor. The capacitor may extend along the full length of the channel or a partial length of the channel.

The pitot tube sensing apparatus may comprise one or more additional capacitors which may be applied adjacent to each other within the channel of the pitot tube and/or along each of the one or more drain holes of the pitot tube.

The capacitor 16 is shown in FIG. 3 to be between the opening 5 and the one or more drain holes 30. In an alternative example, the capacitor may be positioned between the one or more drain holes and the pressure sensor.

The capacitor of the pitot tube sensing apparatus may not conform to the shape of the inner surface of the channel. The capacitor may instead be an alternative shape so long as it performs the function of detecting the presence or absence of a foreign object. For example, the capacitor's two electrodes may be two parallel plates, such that the cross section of the inner surface of the channel is between the two electrodes.

In an alternative example, the cross section of the pitot tube may not be circular (a circular pitot tube cross section is shown in FIG. 4). The pitot tube of the pitot tube sensing apparatus may be any shape which allows a channel from an opening of the channel to a pressure sensor. For example, the pitot tube and/or the channel may have a substantially rectangular cross section shape. The capacitor may conform to the shape of the substantially rectangular cross section shape.

In an alternative example, the parameter indicative of a capacitance of a capacitor of the pitot tube sensing apparatus may not be voltage. For example, the parameter may be current, charge, or any combination of parameters (which may include voltage).

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A pitot tube sensing apparatus comprising:
a pitot tube comprising a channel;
a pressure sensor coupled to the channel;
a capacitor comprising two electrodes on opposing sides of the channel, wherein the two electrodes conform to a shape of an inner surface of the channel; and
a system configured to:
measure a capacitance between the two electrodes; and
determine the presence or absence of a foreign object within the channel based on the capacitance.

2. The pitot tube sensing apparatus of claim 1, further comprising electrical shielding between the capacitor and the pitot tube.

3. The pitot tube sensing apparatus of claim 1, wherein measuring the capacitance comprises measuring a voltage between the two electrodes.

4. The pitot tube sensing apparatus of claim 1, wherein the system is configured to measure the capacitance by applying current across the capacitor.

5. The pitot tube sensing apparatus of claim 1, wherein the determination of the presence or absence of a foreign object is based on a comparison of the capacitance to a detection threshold.

6. The pitot tube sensing apparatus of claim 1, wherein the system is further configured to calculate a rate of change in the capacitance, wherein the determination of the presence or absence of a foreign object is based on a comparison of the rate of change in the capacitance to a detection threshold.

7. The pitot tube sensing apparatus of claim 1, wherein the inner surface of the channel and an inner surface of each electrode have a curved shape in a plane perpendicular to a length of the channel.

8. The pitot tube sensing apparatus of claim 1, wherein the channel is in the shape of a cylinder, and each electrode is in the shape of a cylindrical arc.

9. The pitot tube sensing apparatus of claim 1, wherein the pitot tube sensing apparatus further comprises a trap, the capacitor is between an opening of the channel and the trap, and the trap is arranged to block foreign objects from reaching the pressure sensor.

10. The pitot tube sensing apparatus of claim 1, wherein the pitot tube sensing apparatus is further configured to generate an alert upon determining the presence of a foreign object within the channel.

11. The pitot tube sensing apparatus of claim 1, wherein the pitot tube sensing apparatus is configured to determine a fluid speed based on an output of the pressure sensor.

12. The pitot tube sensing apparatus of claim 1, wherein the electrodes are positioned in the channel between an opening of the channel and the pressure sensor.

13. The pitot tube sensing apparatus of claim 1, wherein the pressure sensor is configured to measure a total pressure in the channel; the pitot tube sensing apparatus further comprises a static pressure sensor configured to measure a static pressure; and the pitot tube sensing apparatus is further configured to calculate a fluid speed based on a difference between the total pressure and the static pressure.

14. An aircraft comprising the pitot tube sensing apparatus of claim 1.

15. An aircraft according to claim 14, wherein the pitot tube sensing apparatus is configured to determine an air speed of the aircraft based on an output of the pressure sensor.

16. A method of determining the presence or absence of a foreign object within a pitot tube sensing apparatus, wherein the pitot tube sensing apparatus comprises:
a pitot tube comprising a channel with an opening;
a pressure sensor coupled to the channel; and
a capacitor comprising two electrodes on opposing sides of the channel,
the method comprising:
measuring a capacitance between the two electrodes; and
determining the presence or absence of a foreign object within the channel based on the capacitance.

17. The method of claim 16, wherein determining the presence or absence of a foreign object is based on a comparison of the capacitance to a detection threshold.

18. The method of claim 16, further comprising calculating a rate of change in the capacitance, wherein the determination of the presence or absence of a foreign object is based on a comparison of the rate of change in the capacitance to a detection threshold.

19. The method of claim 16, further comprising generating an alert upon determining the presence of a foreign object within the channel.

20. A pitot tube sensing apparatus comprising: a pitot tube comprising a channel; a pressure sensor coupled to the channel; a capacitor comprising two electrodes on opposing sides of the channel; and a system configured to:
measure a capacitance between the two electrodes;
determine the presence or absence of a foreign object within the channel based on the capacitance; and calculate a rate of change in the capacitance, wherein the determination of the presence or absence of a foreign object is based on a comparison of the rate of change in the capacitance to a detection threshold.

* * * * *